United States Patent
Pannell

[15] 3,669,438
[45] June 13, 1972

[54] RADIATOR HOLDING DEVICE

[72] Inventor: McNeal Pannell, 210 Knowles Street, Kilgore, Tex. 75662

[22] Filed: Oct. 22, 1970

[21] Appl. No.: 83,124

[52] U.S. Cl. .................................. 269/20, 269/70, 269/309
[51] Int. Cl. ..................... B25b 1/18, B25b 1/22, B25q 1/04
[58] Field of Search ....................................... 269/20, 24–26, 269/32–34, 70, 309

[56] References Cited

UNITED STATES PATENTS

| | | | |
|---|---|---|---|
| 2,848,853 | 8/1958 | Wittkopp | 269/70 X |
| 3,374,935 | 3/1968 | Pechacek | 269/25 X |
| 2,574,589 | 11/1951 | Ragin | 269/32 X |
| 3,301,547 | 1/1967 | Jordan | 269/20 |
| 3,570,839 | 3/1971 | Spadt | 269/70 X |
| 2,679,684 | 6/1954 | Fagan | 269/32 X |

Primary Examiner—Wayne A. Morse, Jr.
Attorney—Victor J. Evans & Co.

[57] ABSTRACT

A hydraulic holding and positioning device having a rotatable arm in a horizontal plane and a holder pivotable in a vertical plane.

1 Claim, 15 Drawing Figures

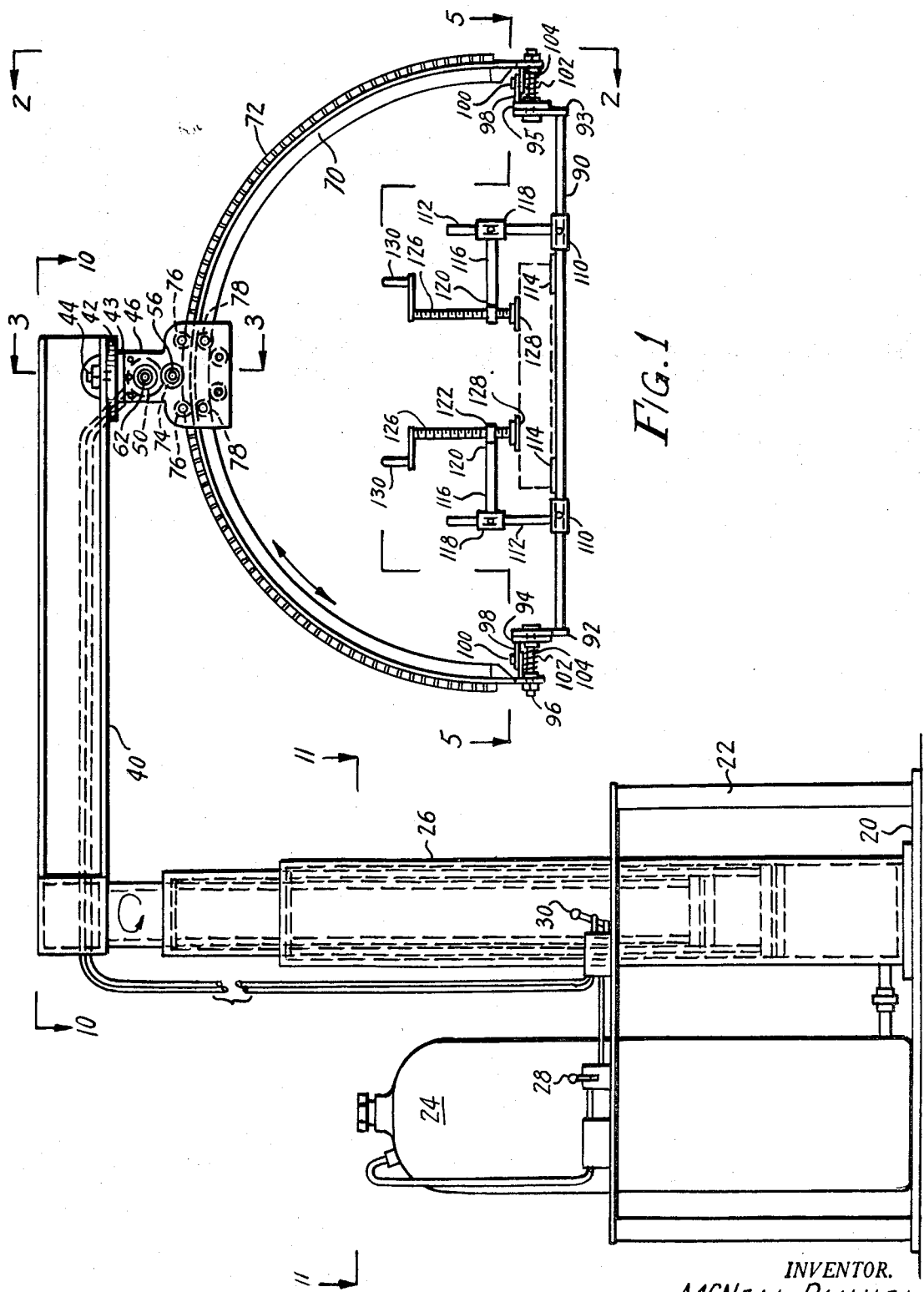

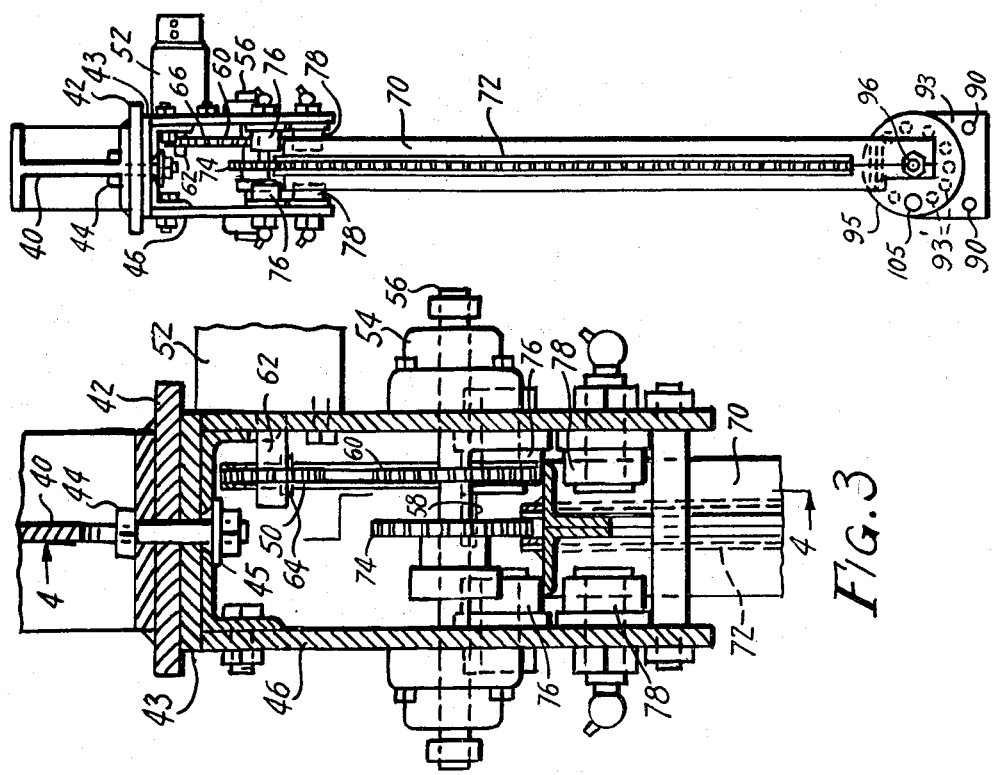
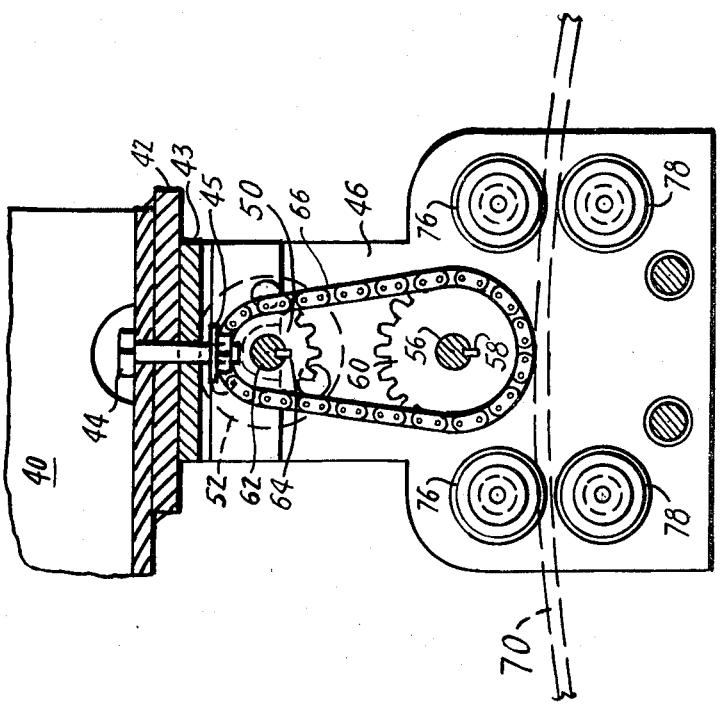
INVENTOR.
MCNEAL PANNELL
BY
Victor J. Evans & Co.
ATTORNEYS.

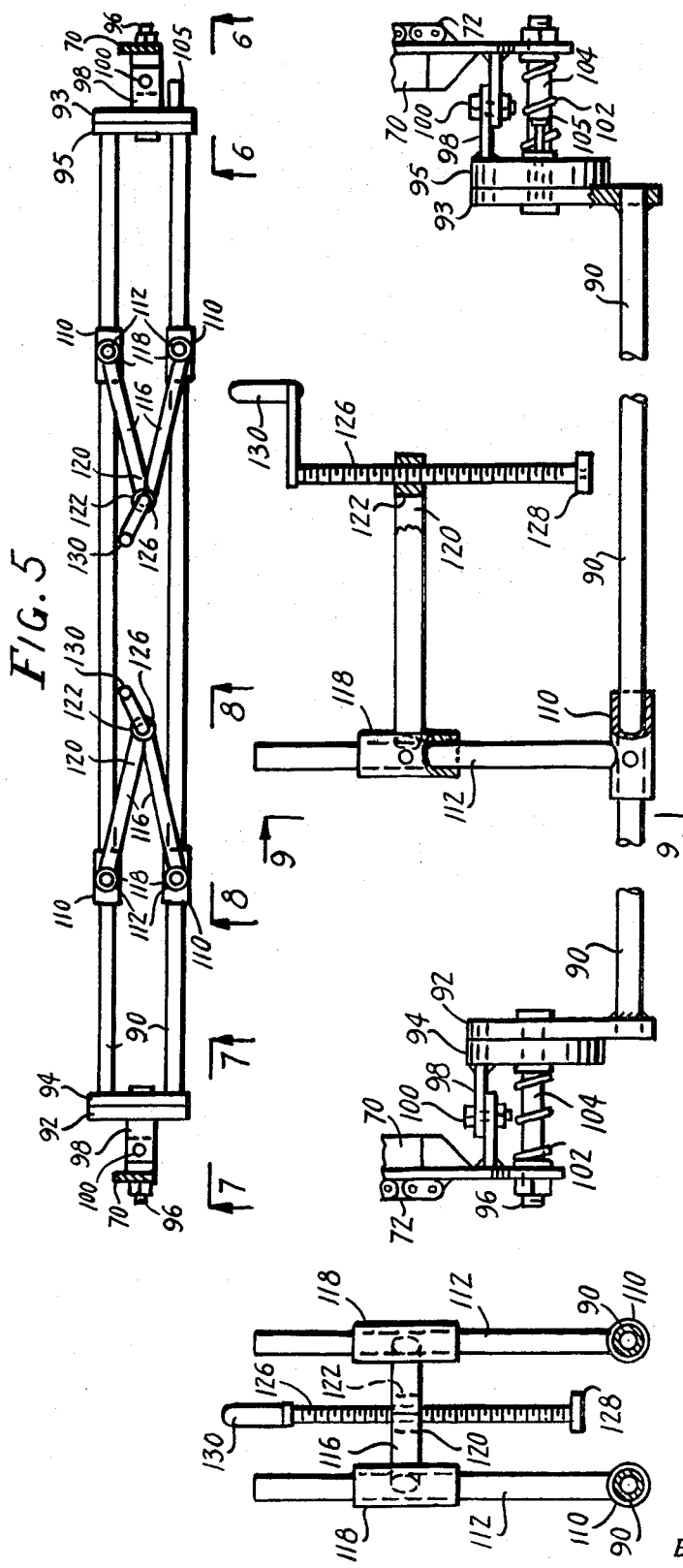

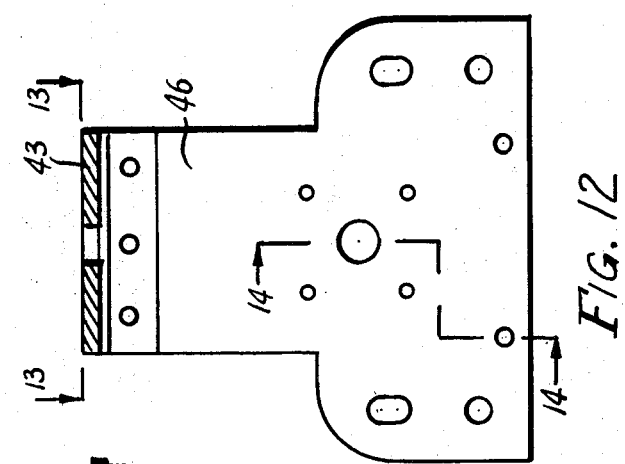
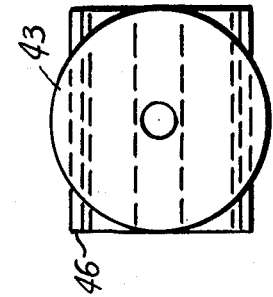
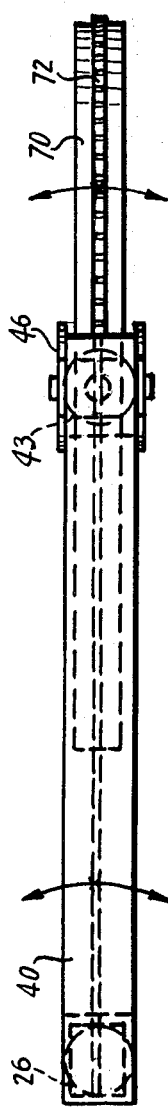
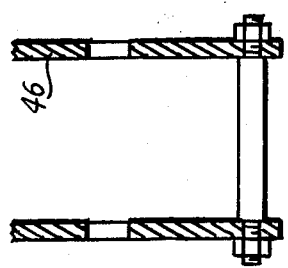
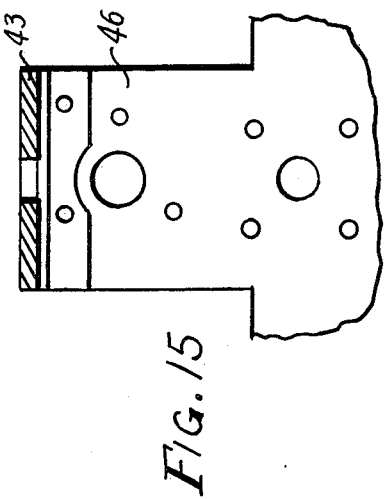
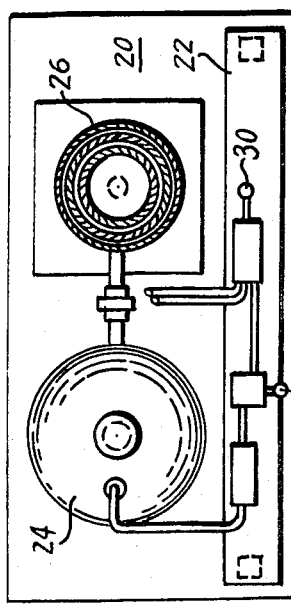

RADIATOR HOLDING DEVICE

This invention relates to a device for lifting and positioning metal parts for welding and soldering.

The primary object of this invention is to provide means for vertical and horizontal positioning of a metal part.

Another object of this invention is to provide means for tilting the metal parts being held after it has been positioned in order to facilitate welding and soldering.

A further object of this invention is to provide positioning, tilting, and holding in a simple and efficient manner without interference with the welding and soldering.

The above and other objects of this invention will become apparent to those skilled in the art after a consideration of the following detailed description of the preferred embodiment of this invention taken together with the accompanying drawing wherein:

FIG. 1 is a side elevational view of the device;
FIG. 2 is a sectional view taken on line 2—2 thereof;
FIG. 3 is a sectional view taken on line 3—3 of FIG. 1;
FIG. 4 is a sectional view taken on line 4—4 of FIG. 3;
FIG. 5 is a sectional view taken on line 5—5 of FIG. 1;
FIG. 6 is a sectional view taken on line 6—6 of FIG. 5;
FIG. 7 is a sectional view taken on line 7—7 of FIG. 5;
FIG. 8 is a sectional view taken on line 8—8 of FIG. 5;
FIG. 9 is a sectional view taken on line 9—9 of FIG. 8;
FIG. 10 is a sectional view taken on the line 10—10 of FIG. 1;
FIG. 11 is a sectional view taken on line 11—11 of FIG. 1;
FIG. 12 is a cross-sectional view showing the side plate of the drive box;
FIG. 13 is a sectional view taken on line 13—13 of FIG. 12;
FIG. 14 is a spacer bar near the bottom of the drive box, and
FIG. 15 is another cross-sectional view showing the side plate of the drive box.

Referring in detail to the drawing, there is shown a mounting 20 and a frame 22 upon which an oil reservoir 24, a three stage hydraulic ram 26, hydraulic controls 28 and 30 are supported. Control 28 allows compressed air to move oil out of reservoir 24 into the cylinders of ram 26 for vertical motion. Releasing air from reservoir 24 will lower ram 26, the ram movement being controlled by a three-way valve 28.

An I-beam 40 is attached at one end thereof to the top of ram 26 for pivotal movement in a horizontal plane about the longitudinal axis of ram 26.

Referring to FIGS. 1–4, there is a plate 42 welded to the bottom surface of beam 40 at the other end thereof. Mounted to the bottom of plate 42 by means of a bolt 44 is a drive box 46. A second friction plate 43 is connected to plate 42 between it and drive box 46. A thrust type bearing 45 allows drive box 46 to be easily pivoted about the longitudinal axis of bolt 44.

Rotatably mounted within drive box 46 is a sprocket 50 driven by a 1½ horsepower reversible air motor 52 mounted against drive box 46. A bearing 54 is mounted on each side of drive box 46 for rotatably housing a shaft 56 within drive box 46. Mounted on shaft 56 by means of a key 58 is a sprocket 60. Sprocket 50 is mounted on a shaft 62 by means of a key 64 and is rotatably connected with sprocket 60 by means of a chain link belt 66 so that rotation of shaft 62 by motor 52 will in turn rotatably drive shaft 56.

Two pieces of angle iron welded back to back form an arced yoke 70 for positioning and holding the metal part or radiator to be welded or soldered. A chain 72 is mounted along the upper surface of yoke 70. A sprocket 74 is mounted for rotation on shaft 56 and a pair of rollers 76 and 78 adjacent the top and bottom surfaces of yoke 70 on each side thereof are rotatably mounted within drive box 46. Sprocket 74 drives connecting chain 72 as shaft 56 turns and yoke 70 is guided by means of rollers 76 and 78.

Between the ends of yoke 70 is mounted two parallel stainless steel tubes 90 by means of two sets of friction plates 92 and 94. The ends of tubes 90 are secured to plates 92, and plates 92 and 94 are mounted to the ends of yoke 70 by means of bolts 96. Each plate 94 is connected to the end of yoke 70 by means of a link bracket 98 which pivots about a link bolt 100. A friction spring 102 longitudinally coiled about bolt 96 between the end of yoke 70 and plate 94 presses plates 94 and 92 against the head of bolt 96. One set of friction plates 92 and 94 acts as an indexing plate in that plate 92, which can normally swivel upon bolt 96, can be held locked into any position on its turning axis by means of holes 93 in plate 92 and a corresponding mating projection or indexing pin 104 extending from plate 94. Indexing pin 104 secured to plate 94 allows it to be momentarily separated from plate 92 for desired adjustment, plates 92 and 94 being slidable along bolt 96, link bracket 98 swivelling about its axis as plate 94 is moved toward the end of yoke 70. In this manner tubes 90 and the radiator or metal part held thereby may be pivoted about bolts 96 to any desired position.

On each tube 90 is a pair of stainless steel sleeves 110, each sleeve 110 supporting a vertical stainless steel tube 112. Mounted crosswise on tubes 90 are a pair of pads 114 comprising steel plates faced with rubber material upon which an object may be placed and held without damage thereto. Pads 114 may be positioned along any point on tubes 90. A tube 116 horizontally extends from a sleeve 118 on each corresponding tube 112 and are joined forming a V 120 with a threaded sleeve 122 at the vertex thereof. A locking screw 126 is threadedly inserted within sleeve 122 and has a pad 128 at the bottom end thereof serving the same purpose as pads 114 and has a handle 130 for manually clamping the metal part or radiator in place.

In summary, control 28 may be actuated for raising and lowering the metal part being worked on. Control 30 is a four-way air valve controlling motor 52 for adjusting the roll of the metal part, beam 40 moves the metal part to a desired location along its horizontal plane, plates 92 and 94 allow adjustment of the pitch of the metal part, drive box 46 allows the metal part to be pivoted to a desired point within its horizontal plane independent of and relative to beam 40, and locking sleeves 110 and 118 allow the metal part to be clamped anywhere along tubes 90.

While the preferred embodiment has been illustrated and described, it will be understood by those skilled in the art that many changes and modifications may be resorted to without departing from the spirit and scope of the invention.

I claim:

1. A positioning and holding device, comprising a hydraulic ram mounted for vertical movement, an oil reservoir connected to said ram, a pressure control connected to the reservoir for actuating said ram, a horizontal beam rotatably mounted at one end thereof on the top of said ram, first means extending below the other end of said beam for rotation of and adjustment of pitch and roll of that which is being held by the device, the rotation and adjustment being independent of and relative to said ram and said beam, said first means including a drive box rotatably mounted below said beam and having a motor attached thereto, a sprocket mounted on the shaft of said motor within said drive box, a second rotatable shaft mounted within said drive box, a second sprocket mounted on said second shaft, a drive chain engaging said sprocket and said second sprocket, an arced yoke slidably held by said drive box and engaging said second sprocket for adjusting the pitch of that which is being held by the device and for the positioning thereof along any conical and plane path independent of and relative to said ram and said beam, second means rotatably connected to the ends of said yoke for adjusting the roll, the positioning along any skew plane, and the mounting of that which is being held by the device, said second means including a pair of friction discs, a spring forcing them together, and an indexing pin for manually separating said discs and adjusting the roll by means of rotating one of said discs relative to the other.

* * * * *